United States Patent
Vecchio et al.

(10) Patent No.: US 11,152,663 B2
(45) Date of Patent: Oct. 19, 2021

(54) ADVANCED BATTERY SYSTEM

(71) Applicant: Datalogic IP Tech S.R.L., Bologna (IT)

(72) Inventors: Claudia Vecchio, Bologna (IT); Simone Paolizzi, Rimini (IT); Cristian Broccoli, Bologna (IT); Dimitri D'Annunzio, Zola Predosa (IT); Pietro Todescato, Eugene, OR (US)

(73) Assignee: Datalogic IP Tech S.R.L., Bologna (IT)

( * ) Notice: Subject to any disclaimer, the term of this patent is extended or adjusted under 35 U.S.C. 154(b) by 463 days.

(21) Appl. No.: 16/011,140

(22) Filed: Jun. 18, 2018

(65) Prior Publication Data

US 2019/0386266 A1    Dec. 19, 2019

(51) Int. Cl.
| | |
|---|---|
| *H01M 50/209* | (2021.01) |
| *G06F 1/26* | (2006.01) |
| *H01M 10/42* | (2006.01) |
| *H01M 10/46* | (2006.01) |
| *H04B 1/3883* | (2015.01) |
| *H04M 1/02* | (2006.01) |

(52) U.S. Cl.
CPC .......... *H01M 50/209* (2021.01); *G06F 1/263* (2013.01); *H01M 10/425* (2013.01); *H01M 10/46* (2013.01); *H04B 1/3883* (2013.01); *H04M 1/0262* (2013.01)

(58) Field of Classification Search
CPC .. H01M 2/1066; H01M 10/425; H01M 10/46; H01M 50/209; G06F 1/263; H04B 1/3883; H04M 1/0262; H02J 1/001; H02J 1/06; H02J 7/0036; H02J 7/0045; H02J 7/0047; Y02E 60/10
See application file for complete search history.

(56) References Cited

U.S. PATENT DOCUMENTS

| | | | |
|---|---|---|---|
| 6,730,432 B1 | 5/2004 | Grosfeld et al. | |
| 8,586,225 B1 | 11/2013 | Bausch et al. | |
| 9,182,809 B2 | 11/2015 | Kitano et al. | |
| 9,813,993 B1 * | 11/2017 | Kim | H04B 1/3883 |
| 10,348,126 B2 * | 7/2019 | Tsai | G01R 33/072 |

(Continued)

FOREIGN PATENT DOCUMENTS

| | | |
|---|---|---|
| EP | 0435317 A2 | 12/1990 |
| EP | 2797200 A1 | 4/2013 |
| KR | 100609957 B1 | 8/2006 |

OTHER PUBLICATIONS

European Search Report corresponding to EP19180493.9, dated Oct. 25, 2019, 8 pages.

*Primary Examiner* — Nha T Nguyen
(74) *Attorney, Agent, or Firm* — Foley & Lardner LLP

(57) ABSTRACT

A mobile device and methods that support performing a warm swap of a battery of a mobile device are provided herein. A processor of the mobile device may initiate a warm swap procedure in response to receiving a request from a user operating the mobile device. The processor generate a first notification signal to indicate to the user to wait before removing the battery from the mobile device. In response to execution of the warm swap procedure, the processor generates a second notification signal to indicate to the user that the battery of the mobile device is safe to be warm swapped with a charged battery.

17 Claims, 9 Drawing Sheets

(56) References Cited

U.S. PATENT DOCUMENTS

| | | | |
|---|---|---|---|
| 2001/0017532 A1* | 8/2001 | Han | H04W 52/0296 320/114 |
| 2002/0011823 A1* | 1/2002 | Lee | H02J 7/0013 320/137 |
| 2004/0179334 A1* | 9/2004 | Kinnard | G06F 1/263 361/601 |
| 2005/0003266 A1* | 1/2005 | Wulff | H01M 2/1016 429/97 |
| 2005/0052085 A1* | 3/2005 | Chang | H02J 9/061 307/66 |
| 2010/0124896 A1* | 5/2010 | Kumar | H04M 1/72536 455/404.1 |
| 2012/0194350 A1* | 8/2012 | Crisp | G06F 1/26 340/815.42 |
| 2012/0296174 A1* | 11/2012 | McCombie | A61B 5/0404 600/301 |
| 2012/0322431 A1* | 12/2012 | Kil | G06F 1/3206 455/418 |
| 2013/0120106 A1* | 5/2013 | Cauwels | A61B 5/7475 340/3.1 |
| 2014/0082393 A1* | 3/2014 | Liang | G06F 1/3212 713/323 |
| 2014/0346873 A1* | 11/2014 | Colangelo | H02J 1/00 307/29 |
| 2015/0076915 A1* | 3/2015 | Liang | H02J 7/00716 307/66 |
| 2016/0049066 A1* | 2/2016 | Henderson | A61B 8/467 340/679 |
| 2016/0118827 A1* | 4/2016 | Borngraber | H02J 7/0036 320/103 |
| 2016/0197496 A1* | 7/2016 | Rich | H01M 10/46 320/162 |
| 2016/0274633 A1* | 9/2016 | Nishimura | G06F 1/263 |
| 2017/0147324 A1 | 5/2017 | Weber et al. | |
| 2017/0168525 A1* | 6/2017 | Li | H02J 7/0045 |
| 2017/0271891 A1* | 9/2017 | Keates | H02J 7/0024 |
| 2017/0310135 A1* | 10/2017 | Masaoka | G06F 1/263 |
| 2017/0310138 A1* | 10/2017 | Masaoka | H02J 7/0068 |
| 2017/0338690 A1* | 11/2017 | Higashide | H02J 7/0063 |
| 2018/0241236 A1* | 8/2018 | Vasefi | H02J 1/00 |
| 2019/0341951 A1* | 11/2019 | Grifoni | H04M 1/185 |

* cited by examiner

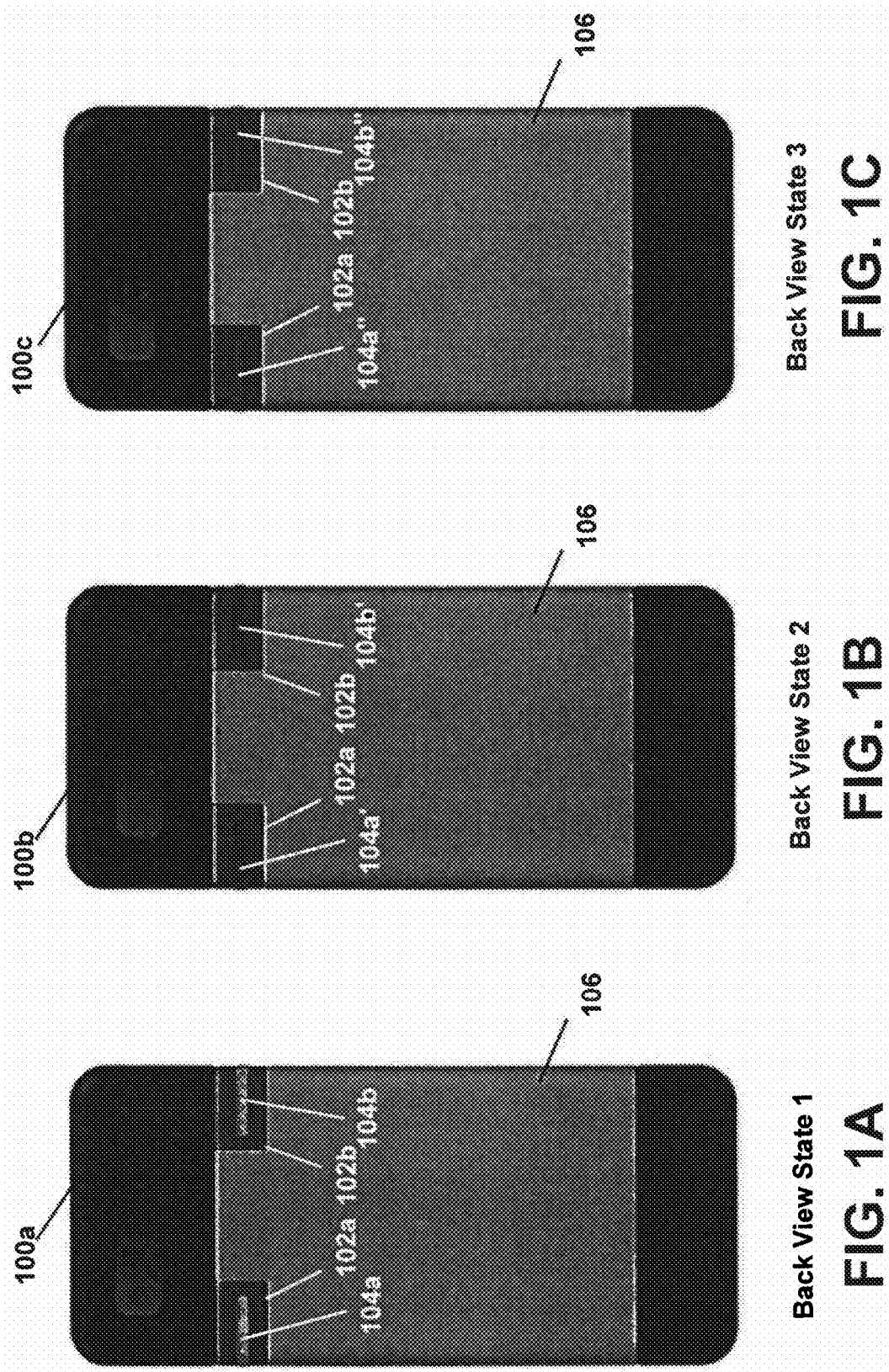

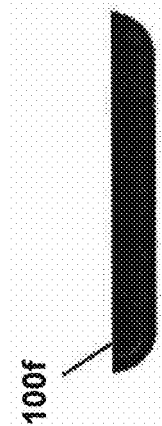
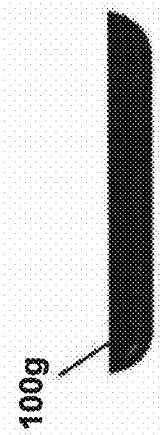
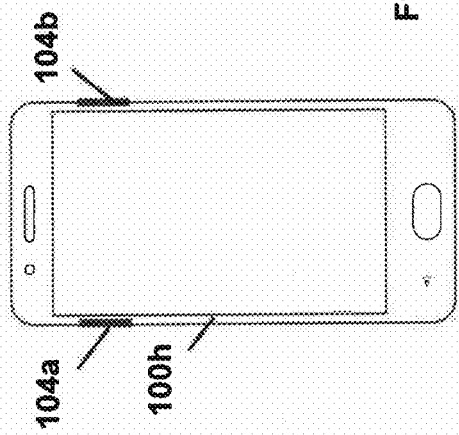
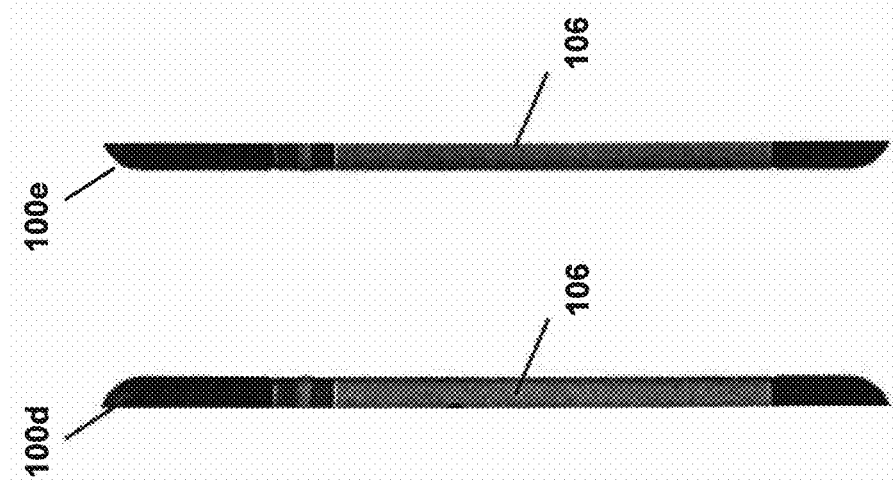
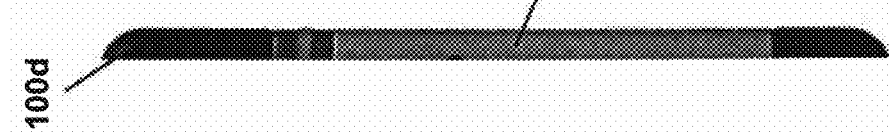

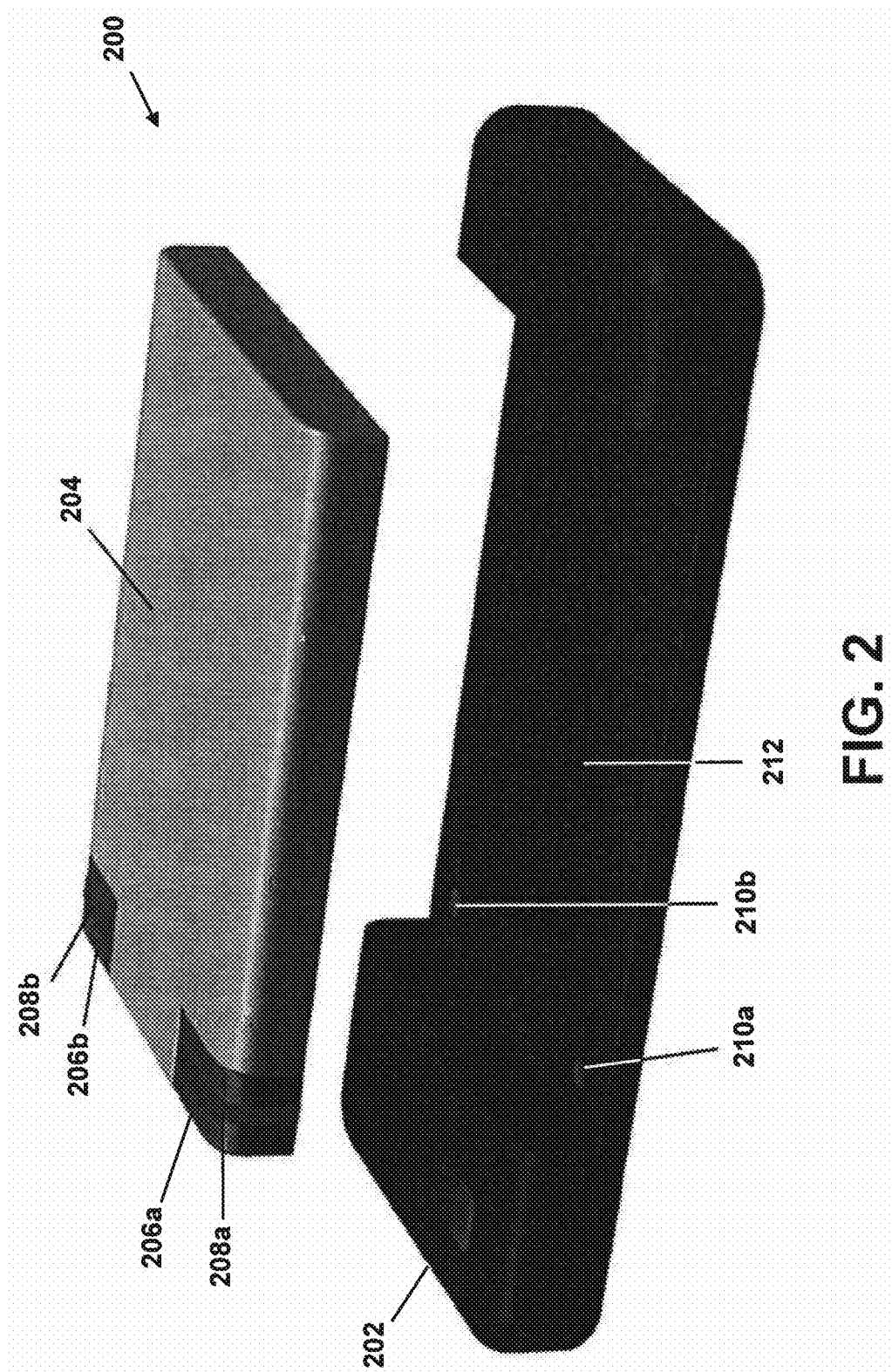

ADVANCED BATTERY SYSTEM

BACKGROUND

Mobile devices, such as smart phones, tend to consume large amounts of power relative to the size of battery used to power the devices. As such, mobile devices have historically used rechargeable batteries. As understood in the art, a rechargeable battery is a type of electrical battery that can be charged, discharged, and recharged many times. Because rechargeable batteries are economically desirable, many electronic devices, particularly mobile devices, utilize replaceable and rechargeable batteries. Mobile devices that are replaceable are generally configured to allow a user to freely release the battery when discharged and replace with a fully charged battery. However, releasing batteries from the mobile devices has created technical challenges. For instance, because a rechargeable battery is typically the main and only source of electric power for a mobile device, a user may have to terminate all operations before releasing the battery. Otherwise, if the battery is released while the electronic device in still in operation, the electronic device may completely lose power and data relating to all ongoing processes and operations may be lost.

In order to continue operation of a battery-charged electronic device when replacing the battery, some electronic devices offer "hot swapping" of the battery, where the electronic device may switch to a secondary battery while the primary battery is being replaced. However, having two independent batteries increases cost, size, complexity, and weight of the electronic device. Therefore, hot swapping is not desirable, especially for smaller mobile electronic devices, such as mobile phones.

Another conventional method of swapping a battery is "warm swapping," where the electronic device is placed in a low power mode with limited functionality, and typically uses a capacitor to store a small charge to support the low power mode functionality for a limited period of time in order to allow the user to replace the battery without losing data or damaging electronic components. However, since the implementation of warm swapping, some challenges have been discovered. For instance, users are often unaware (i) when the warm swapping procedure starts, (ii) when the warm swapping procedure ends, or (iii) when to release the battery. A proper time of releasing the battery is particularly problematic for mobile devices as the battery is typically located on an opposite side of the device from the electronic display screen of the electronic device, for instance, at the back of the electronic device. If the battery is released from the electronic device too soon, data may be lost and/or the device may be in a transition state that is not ideal for a variety of technical reasons. Furthermore, depending on the circumstances, such as in dark settings, quickly replacing the battery is difficult. As such, an improvement in "warm swapping" technology is desirable.

SUMMARY

To improve warm swapping of batteries of a mobile device, battery retaining structure(s) configured to display light signals to a user when visible from the rear of the mobile device may be provided. The light signals may indicate to a user (i) that the mobile device is entering into a warm swap state or mode, and (ii) when the battery of the mobile device may be swapped after the mobile device has transitioned into the warm swap state. After mobile device has entered the warm swap state, the user may swap the battery without impacting data or damaging electronics of the mobile device. The user may cause the mobile device to enter into the warm swap state by (i) interacting with an operating system of the mobile device via an electronic display thereof, (ii) interacting with a mobile app that interfaces with the operating system, (iii) pressing or sliding one or more of the battery retaining structures simultaneously or individually, which may trigger the operating system to transition into the warm swap state, or (iv) pressing or otherwise interacting with another button or other feature of the mobile device.

According to an embodiment, a mobile device may include a retaining structure configured to be actuated by a user and having two states. A first state may be configured to retain a battery of the mobile device and a second state configured to release the battery of the mobile device. An electronic signaling user interface may include at least one light source. A processor may be in electrical communication with the electronic signaling user interface, and be configured to, in response to receiving a request to perform a warm swap procedure that initiates the warm swap procedure to set electronic components to a warm swap mode. In response to initiating the warm swap procedure, the processor may cause the electronic signaling user interface to emit a first light signal by the light source(s). In response to setting the electronic components in the warm swap mode, the processor may cause the electronic signaling user interface to emit a second light signal by the light source(s), thereby indicating to a user that the battery of the mobile device can be warm swapped by actuating the retaining structure. In response to a charged battery replacing the battery, the electronic components may be powered up from the warm swap mode to be in an operational mode.

In another embodiment, a method of performing a warm swap of a battery of a mobile device may include initiating a warm swap procedure to set one or more electronic components of the mobile device to a warm swap mode. In response to initiating the warm swap procedure, a first notification signal may be generated, thereby indicating to a user to wait before removing the battery. In response to execution of the warm swap procedure, a second notification signal may be generated, thereby indicating to a user that the battery of the mobile device is safe to be warm swapped. In response to a charged battery replacing the battery of the mobile device, the electronic components may be powered up from the warm swap mode to be in an operational mode.

In yet another embodiment, a mobile device includes a battery and a first retaining structure configured to retain the battery of the mobile device. The first retaining structure may include a first location at which light signals are emitted. A second retaining structure may also be configured to retain the battery, and may include a second location at which light signals are emitted.

More generally, embodiments disclosed herein describe systems and methods for performing a warm swap of a battery of a mobile device. In response to receiving a battery replacement request from a user operating the mobile device, a processor of the mobile device may initiate a warm swap procedure to either provide a secondary temporary power source for the mobile device or place one or more components of the mobile device in a low power mode. The processor may also generate a first signal to be communicated to the user. As a result of the warm swap procedure executing (e.g., when the secondary power source has been established or when the one or more components are set to the low power mode), the processor may generate a second signal to be communicated to the user. The second signal may indicate to the user that the battery of the mobile device is safe to be replaced. When the user replaces the battery, the processor may stop the second signal from being communicated to the user, and, optionally, generate a third signal to be communicated to the user. The signals may be visual and/or audible.

BRIEF DESCRIPTION OF THE DRAWINGS

Illustrative embodiments of the present invention are described in detail below with reference to the attached drawing figures, which are incorporated by reference herein and wherein:

FIGS. 1A-1H are illustrations of an illustrative mobile device configured to support a warm swapping procedure of a battery with signaling to a user according to the principles described herein;

FIG. 2 is an illustration of a mobile device inclusive of a device portion and an illustrative battery pack inclusive of a warm swap signaling structure;

DETAILED DESCRIPTION OF THE DRAWINGS

Figure 3:
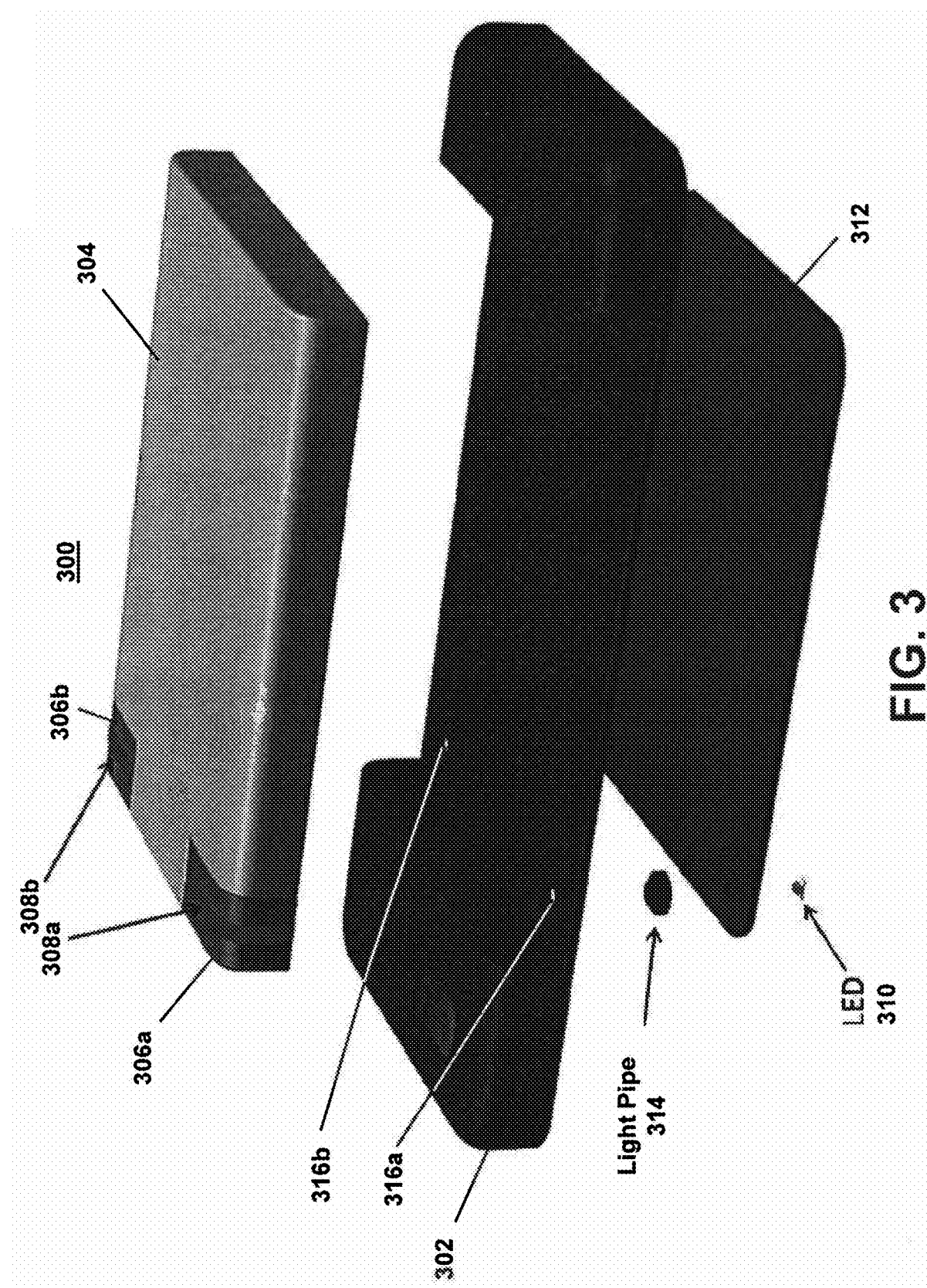
FIG. 3 is an illustration of an illustrative mobile device having a signaling user interface to generate and display warm swapping signals to a user when performing a warm swap of the battery.

With regard to FIGS. 1A-1H, illustrations of an illustrative mobile device 100a-100h (individually 100) inclusive of one or more battery retaining structures 102a and 102b (collectively 102) optionally including light source features 104a and 104b (collectively 104) that may be disposed on the retaining structures 102 are shown. The retaining structures 102 may be configured to releasably engage a battery pack 106. The retaining structures 102 may be configured with mechanical releases that are activated to release and secure the battery pack 106 by sliding, pushing, rotating, or otherwise to the mobile device 100, as understood in the art. The light source features 104 may be configured to provide light signals to the user for indicating different states of a warm swap procedure. The light source features 104 may be translucent portions of the retaining structures 102 through which light signals may be illuminated. In an embodiment, light sources, such as light emitting diodes (LEDs), may be positioned within the retaining structures. Alternatively, the light sources may be positioned in another structure, such as the battery pack 106 or within the mobile device 100. For instance, the light sources may be positioned on a motherboard or other circuit board of the mobile device 100, such as illustrated in FIG. 3. The light sources may be used for generating light signaling during warm swapping of the battery pack 106, as further described herein. The mobile devices 100a-100h illustrate different angles of view of the mobile device 100 to show the ornamental aspects of the retaining structures 102 and light source features 104.

During a warm swap procedure for replacing the battery pack 106, and as shown in FIGS. 1A-1C, in response to a user initiating a warm swap procedure, where three states are shown, including state 1 (pre-warm swap procedure), state 2 (mobile device entering a warm swap state), and state 3 (mobile device entered the warm swap state). In state 1, the light source features 104 are off (i.e., not illuminated). In state 2, the light source features 104 are illuminated with a first color (e.g., red) or other illumination state (e.g., flashing). In state 3, the light source features 104 are illuminated with a second color (e.g., green) or other illumination state (e.g., continuous illumination). Although not shown, after the battery pack 106 has been swapped, another state in which the light source features 104 of the new battery pack to output the second color (e.g., green), a third color (e.g., purple) and/or illumination state (e.g., fast flashing light) may be produced. Alternatively, the state after completing the warm swap may be the same as state 1, where the light source features 104 are not illuminated. If the battery pack 106 is not swapped during a time limit (e.g., 90 seconds) of the warm swap, then another state may be entered upon a new battery being added to the mobile device 100 to produce a signal (e.g., flashing red light) to indicate to the user that data may have been lost as a result of the battery pack 106 not being timely replaced. In some configurations, if the battery pack 106 is not swapped during the time limit, the mobile device 100 may revert back to the pre-warm swap procedure. For instance, the mobile device 100 may resume normal operations.

With regard to FIG. 2, an illustration of a mobile device 200 inclusive of a mobile device portion 202 and an illustrative battery pack 204 inclusive of an optional warm swap signaling structure is shown. The battery pack 204 may include latches 206a and 206b (collectively 206) to retain the battery pack 204 to the mobile device portion 202. In the depicted embodiment, the retaining structure, which may be formed in part by the latches 206, includes two states. The first state is a retained state, where the battery pack 204 is retained or otherwise releasably attached to the mobile device portion 202. The second state is a "released state," where the battery pack 204 is no longer retained or attached to the mobile device portion 202. When retained, the battery pack 204 is operatively coupled to the mobile device portion 202. For instance, an electrical contact (not shown) between the battery pack 204 and the mobile device portion 202 provides for electrical current to flow from the battery pack 204 to electronics of the mobile device portion 202 when the battery pack 204 is retained. When the battery pack 204 is released, as depicted in FIG. 2, the flow of electric current terminates and the battery pack 204 is no longer operatively coupled with the mobile device portion 202. The attachment of battery pack 204 may be accomplished by coupling the battery pack 204 to the mobile device portion 202 using the latches 206.

In a non-limiting example, each latch 206a or 206b may include one or more latch grooves corresponding to one or more protrusions of the mobile device 100 (not shown). When the latches 206 are in a first state (e.g., when the battery pack 204 is retained), the latch grooves are engaged with their corresponding protrusions. When the latches 206 are in a second state (e.g., when the battery pack 204 is not retained), the latch grooves are not engaged with their corresponding protrusions. A person skilled in the art will appreciate that each of the latches 206 may also utilize any other retaining configuration to retain the battery pack 204 to the mobile device portion 202, as understood in the art.

In a non-limiting example, when the battery pack 204 is to be disengaged, a user applies a force (e.g., inward force) on the latches 206. In response to the force being applied, the latch grooves disengage from the protrusions. As a result, the battery pack 204 is disengaged from the mobile device portion 202, and the retaining structure enters the second state where the battery pack 204 is no longer retained. In another non-limiting example, the user may need to apply forces to the latches 206a and 206b independently (i.e., a first force to latch 206a at a first time and a second force to latch 206b at a second time). For instance, each of the latches 206 may include different latch protrusions and grooves that are independently operable from one another. In those embodiments, the user applies force to one latch (e.g., latch 206a) and partially disengages the battery pack 204. However, the battery pack 204 is not fully disengaged until and unless the user independently applies force to the second latch (e.g., latch 206b).

Additionally or alternatively, the retaining structure may utilize an electromechanical process and mechanism to engage and/or disengage the battery pack 204. For instance, one or more of the latches 206 may include an electromechanically operated element (e.g., protrusion or groove). The electromechanically operated element may be controlled and moved by a processor of the mobile device 200. For instance, instead of the user exerting force onto the latches 206, a solenoid, operatively controlled by the processor of the mobile device 200 may actuate the latch 206a and/or 206b in order to disengage the battery pack 204. In a non-limiting example, a user may initiate a disengagement process via an application being executed by the mobile device 200. Upon receiving a signal that the user desires to disengage the battery pack 204, the processor may actuate the latch 206a and/or 206b (e.g., via a solenoid) to enable the battery pack 204 to be disengaged. In yet another embodiment, the user may initiate the disengagement process by pressing a physical button other than the latches 206 on the mobile device 200.

Latches 206 may further include translucent portions 208a and 208b (collectively 208), respectively. The translucent portions 208 are configured to provide a signaling user interface having an LED light to emit light signals to the user during a warm swap procedure. For instance, light generated by the signaling user interface may be displayed through the translucent portions 208. The signaling user interface is further described with regard to FIGS. 3 and 4. Although the light signals may be used for warm swap procedures, alternative uses for the light signals are also contemplated. In an embodiment, rather than the latches 206 including translucent portions 208, translucent features at, but not on, the latches 206 may be included. For example, translucent features in the shape of arrows disposed on a housing of the battery pack 204 and/or mobile device portion 202 may point to the latches 206 when the light signals are produced, thereby notifying the user when to engage or not engage the latches 206.

Referring back to FIGS. 1A-1H, when a user desires to replace the battery pack 106 without service interruption (e.g., loss of data), the user may simultaneously or non-simultaneously engage retaining structures 102. As described above, the user may manually exert pressure on the retaining structures 102. In some embodiments, the user may alternatively actuate the retaining structures 102 via an application executing on the mobile device 100. In some other embodiments, the user may actuate the retaining structures 102 by pressing a button of the mobile device 100. In response to the user actuating the retaining structures 102, the mobile device 100 may initiate a warm swap procedure. In response to initiating the warm swap procedure, the mobile device 100 may generate and emit a first signal to the user. For instance, the mobile device 100 may cause a signaling user interface to generate and/or emit a light signal as the first signal via the light source features 104. The signaling user interface is further described with regard to FIGS. 3 and 4.

The first signal may be a light signal emitting from the retaining structures 102 of the battery pack 106. For instance, the translucent portions of the retaining structures 102 (e.g., translucent portions 104a'-b') may emit a red light as depicted in FIG. 1B (in contrast with no light from the translucent portions 104 as depicted in FIG. 1A). The first light signals may be any color (e.g., red, green, blue, yellow, and the like) or may be a flashing light with a predetermined frequency (e.g., one flash per second, two flashes per second, and the like). Any combination of color and/or lighting effect (e.g., flashing, continuously increasing and decreasing intensity, and the like) may be utilized.

In some configurations, the first signal may alternatively be an auditory or haptic signal. For instance the mobile device 100 may generate a haptic signal (e.g., vibration of the mobile device 100 in accordance with a predetermined vibration pattern and/or frequency). Additionally or alternatively, the mobile device may utilize one or more speakers communicatively coupled with the mobile device 100 to emit a pre-determined noise (e.g., tone, voice, such as "entering warm swap mode," "okay to swap battery," etc.), to signal different states of the warm swap process to the user. Additionally or alternatively, the first signal may also include a light emitted from a source other than via the retaining structures 102. For instance the mobile device 100 may be equipped with a camera flash light, and the mobile device 100 may activate the flash light in order to communicate the warm swap notification signals. In some configurations, the mobile device 100 may use one or more permutations of the embodiments described above to communicate the warm swap notification signals to the user.

A warm swap procedure ensures that the mobile device 100 can temporarily operate without a main power source without losing certain functionality. For instance, the warm swap procedure may provide a temporary secondary power source to ensure that the mobile device 100 has a continuous flow of electric power to support minimal functionality (e.g., active data storage, clock, etc.). The secondary power source is typically a short term, temporary power source that is used as the drive power source instead of the battery pack 106 when the battery pack 106 cannot be used, such as when the battery pack 106 is being replaced by the user. A non-limiting example of a secondary power source may include a supercapacitor. A supercapacitor is a high-capacity capacitor with capacitance values much higher than other capacitors, but lower voltage levels. A supercapacitor may typically store 10 to 100 times more energy per unit volume or mass than other capacitors, can accept and deliver charge much faster than batteries, and can tolerate many more charge and discharge cycles than rechargeable batteries. By initiating the warm swap procedure, the mobile device 100 may temporarily transition electrical power sourcing from the battery pack 106 to being from a temporary power source (e.g., a supercapacitor) integrated into the mobile device 100.

Additionally or alternatively, the warm swap procedure may reduce or minimize the power consumption of the mobile device 100. For instance, one or more component of the mobile device 100 may be placed in a "low power" or "power conservation" mode, while other devices that are not used for preserving data may be turned off completely or disabled during the warm swap procedure. For instance, a display brightness of the mobile device 100 may be set to a lowest level or disabled, auditory functionality may be limited or disabled, and/or external devices connected to the mobile device 100 may be disabled. It should be understood that different mobile devices may be configured in different manners, and, consequently, settings of electronic devices during the warm swap procedures may be different. However, the ultimate function of preserving data and avoiding damaging electronic devices of the different mobile devices may be the same across different mobile devices with different configurations.

When the warm swapping procedure is executed (e.g., when a secondary power source has been established, data has been stored, one or more components of the mobile device 100 have been placed in the low power mode), the mobile device 100 may generate a second signal that is different than the first signal. As described above, in some configurations, the mobile device 100 may cause a signaling user interface to generate and/or emit the first signal while the mobile device is being set into the warm swap mode. A signaling user interface is further described in FIG. 3 and FIG. 4.

The second signal may indicate that the user may safely replace the battery pack 106 as the electronics have been set in proper warm swap states (e.g., low power modes, disabled, etc.). For instance, the mobile device 100 may generate and emit a second signal, such as shown in FIG. 1C, where both of the light source features 104″ are emitting a second color (e.g., green) rather than the first color (e.g., red) of the light source features 104′ of FIG. 1B. The second signal may be a light signal sourced by a lighting device (e.g., LED) from the battery pack 106 or the latches 102*a* and 102*b* and via the light source features 104. As previously described, the second light signals may be any color (e.g., red, green, blue, yellow, and the like) or may be a flashing light with a predetermined frequency (e.g., one flash per second, two flashes per second, and the like). As further described above, the second signal may also be haptic, auditory, or both.

The first and the second signals may also be visible from each side of the mobile device 100. For example, a user may be able to see retaining structures 102 and light source features 104 from the side, as depicted in FIG. 1D and FIG. 1E. FIGS. 1F-1G provide a top and bottom view of the mobile device 100, where the retaining structures 102 and light source features 104 may not be visible. Furthermore, as depicted in FIG. 1H, light source features 104 may be visible to the user from a front view of the mobile device 100. In other embodiments, the light source features 104 may not be visible from the front view.

In some configurations, the mobile device 100 may be configured to generate and communicate other signals to the user. These signals may notify the user regarding other attribute of the battery pack 106. For instance, the mobile device 100 may generate and communicate a third signal that indicates whether the battery pack 106 has been correctly attached to the mobile device 100 during the warm swap timeframe, as further described herein. In some embodiments (e.g., some industrial battery designs), a user may be able to connect the battery pack 106 to the mobile device 100 in multiple orientations and using multiple battery connection options. After a new battery has been attached, the mobile device 100 may receive one or more signals from one or more battery connectors (not shown) and determine whether the battery pack 106 (or a new battery pack replacing the battery pack 106) was correctly attached to the mobile device 100. If the battery pack 106 was not correctly attached, the mobile device 100 may generate and communicate a third notification signal (e.g., different color or different flashing frequency than the first two notification signals). The third notification signal may be communicated to the user via the battery pack 106, the mobile device 100, or one or more accessories (e.g., multi-battery charger or a docking station for spare battery charging).

In some configurations, the mobile device may generate and communicate a fourth signal to the user. The fourth signal may indicate a battery contact status check. For instance, the fourth signal may indicate a status of one or more battery connector pins. The mobile device 100 may determine whether the battery pack 106 (or the new battery replacing the battery pack 106) responds normally to a set of predefined electrical stimulus. Subsequently, the mobile device 100 may generate a fourth notification signal. The fourth signal may be different than the first three notification signals. For example, when the battery pack 106 does not respond to a predefined electrical stimulus, the mobile device 100 may emit the fourth notification signal (e.g., yellow flashing light). The mobile device 100 may also communicate the fourth signal when the battery pack 106 responds to the predefined electrical stimulus.

In some configurations, the mobile device 100 may generate and communicate a fifth signal to the user. The fifth signal may indicate whether the battery pack 106 (or a new battery pack replacing the battery pack 106) is an authorized and/or authenticated battery. The mobile device 100 may authenticate the battery pack 106 (or a new battery replacing the battery pack 106) using a battery authentication system/procedure. The battery pack 106 may include a smart battery, for example, that includes internal circuitry (e.g., memory, processor) and is capable of storing and outputting data, such as serial number, type, etc., associated with the battery. For instance, a processor of the mobile device 100 may communicate with the internal circuitry of the battery pack 106 (or new battery pack) in order to authenticate the battery. When the battery pack is authenticated, the mobile device 100 may generate and communicate a fifth notification signal, where the fifth notification signal may be different than the first four notification signals. The fifth notification signal may indicate that a new battery pack that is authenticated and/or authorized. Additionally or alternatively, the fifth notification signal may indicate that the battery pack is not authenticated or authorized.

In some configurations, the mobile device 100 may generate and communicate a sixth notification signal to the user. The sixth notification signal may indicate whether the battery pack 106 (or a new battery pack replacing the battery pack 106) satisfies one or more charge thresholds. Upon the user replacing the battery pack 106, the mobile device 100 may determine a battery charge value associated with the new battery pack (e.g., voltage level of the new battery pack). In an embodiment, the sixth notification signal may be or include an audible signal that speaks a measured voltage level. In another embodiment, a lighting device behind the translucent portions 104 may include an LCD, LED, or other display elements to display a meter-like level or alphanumeric representative of the voltage level or threshold. Upon the battery charge value satisfying one or more pre-determined charge thresholds (e.g., 50% charge, 20% charge, or 10% charge), the mobile device 100 may communicate a sixth notification signal indicating the battery charge value to the user.

Figure 4:
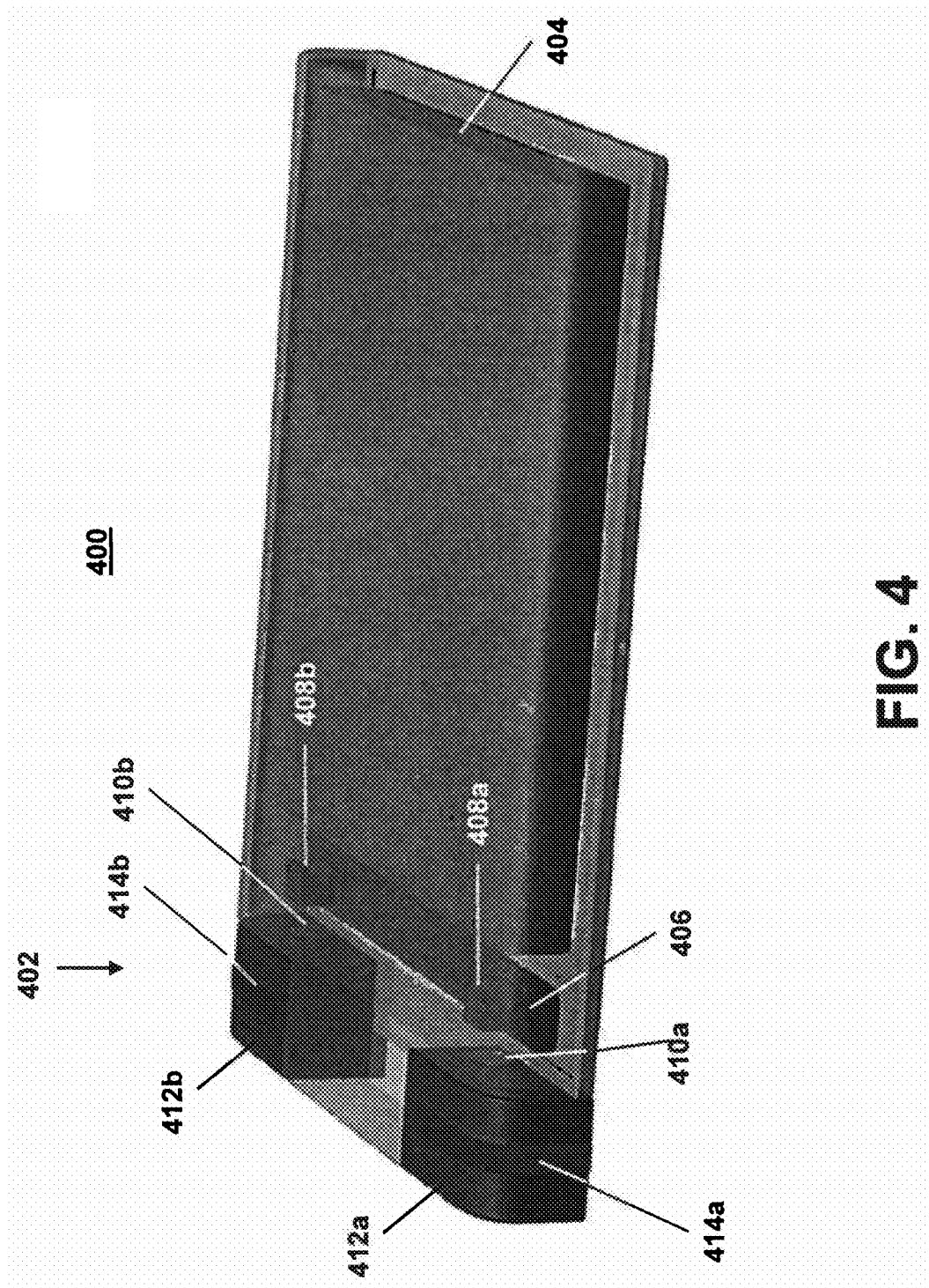
FIG. 4 is an illustration of an illustrative the battery pack of a mobile device inclusive of a signaling user interface that generates battery swapping signals for a user during a warm swap procedure.

The sixth notification signal may be different for each charge threshold. For instance, when the battery has a 50% charge, the sixth notification signal may different than when the battery pack has a 10% charge. The sixth notification signal may also be generated and communicated by the battery pack 106 itself. For instance, as illustrated in FIG. 4, a signaling user interface may be housed within the battery pack 106. In those embodiments, the battery pack 106 may generate and communicate the sixth notification signal when the charge value is below one or more pre-determined charge thresholds. Therefore, the battery pack 106 may also emit the sixth notification signal when operationally coupled to the mobile device 100 and/or to an accessory, such as a separate charging station. For instance, a user may be able to visually identify whether the battery pack 106 satisfies a charge threshold even when the battery is not connected to the mobile device 100 (e.g., being charged separately). In this way, because each individual battery indicates its own charge status, misunderstandings can be avoided when multiple batteries are being charged.

Referring now to FIG. 3, an illustration of an illustrative mobile device 300 having a signaling user interface driven by electronics and at least one light source housed within a mobile device portion 302 of the mobile device 300 to generate warm swapping signals is shown. The mobile device portion 302 includes a battery pack 304 that includes latches 306a and 306b (collectively, latches 306) with translucent portions 308a and 308b (collectively, translucent portions 308). The mobile device portion 302 further includes a light source(s) 310, such as light emitting diode LED, a printed circuit board (PCB) 312, and light pipe 314. Although not shown, another light source and light pipe may be provided to illuminate the translucent portion 308b.

As depicted, the mobile device portion 302 includes the signaling user interface, which may include electronics, such as a processor (not specifically shown, but on the PCB 312), driver electronics (not specifically shown, but optionally positioned on the PCB 312), software executing on the processor, light source(s) 310, light pipe(s) 314, may be configured to generate light signals and emit the light signals through the translucent portions 308 of latches 306. Even though the translucent portions 308 are shown as strips of translucent portions, in other configurations, the translucent portions 308 may have different shapes. For example, the translucent portions 308 may be any shape, including circular, square, rectangle, polygonal, or any other shape, such as a logo of a manufacturer of the mobile device. In some configurations, the latches 306 are entirely translucent. In some configurations, other portions of the battery pack 304 may also be translucent and may also communicate the first and/or the second signals to the user. For example, portions or all of the battery pack 304 may be translucent. The translucent portions 308 may be configured to emit, shine, reflect, refract, or otherwise allow various light signals generated by the signaling user interface to pass through to the user. Still yet, the translucent portions 308 may have certain optical properties, such as a lens (concave, convex, Fresnel, diffraction grading, and so on).

The signaling user interface may include the PCB 312, which may mechanically support and electrically connect the electronic components within the signaling user interface. The PCB 312 may include conductive tracks, pads, and other features etched from one or more sheet layers of copper laminated onto and/or between sheet layers of a non-conductive substrate. In operation, when a light signal is generated, the light ultimately radiates through the light pipe 314 and the holes 316a and 316b defined by the mobile device portion 302 to the latches 306, where the translucent portions 308 allow the light to pass through in a manner that is visible to the user.

Referring now to FIG. 4, an illustration of an illustrative a battery pack 400 of a mobile device inclusive of a signaling user interface 402 that generates swapping signals for a user during a warm swap procedure is shown. As depicted, the battery pack 400 houses a battery 404. The battery pack 400 may include a PCB 406, LEDs 408a and 408b (collectively 408), light pipes 410a and 410b (collectively 410)), latches 412a and 412b (collectively 412), and translucent portions 414a and 414b (collectively 414), which may be configured and function as previously described. The battery 404 may be any rechargeable battery, such as a lithium-ion battery in which lithium ions move from the negative electrode to the positive electrode during discharge and back when charging. The battery 404 may be used as the main source of power for the mobile device. As described above, latches 412 may be configured to interact with a retaining structure of a mobile device. The latches 412 can engage with a corresponding retaining structure of the mobile device. When engaged with the retained structure of a mobile device, the latches 412 ensure that the battery pack 400 is structurally and electrically connected to the mobile device. As described above, the latches 412 can also be actuated to disengage the battery pack 400, for example, when replacing the battery pack 400.

The PCB 406 may mechanically support and electrically connect the electronic components within the signaling user interface. The PCB 406 may include electronics that are used to drive the LEDs 408 during the warm swap mode, as described herein. When light signals are generated by the LEDs 408, the light is projected through the light pipes 410 and cavities (not shown) within and defined by the latches 412, where the translucent portions 414 allow the light to pass through in a manner that is visible to the user.

As depicted, the signaling user interface may be integrated into the battery pack 400 and may operate (e.g., generate light signals) in conjunction with the mobile device to which the battery pack 400 is engaged. For instance, the signaling user interface may receive an instruction signal from a processor of the mobile device to which the battery pack 400 is engaged. The instruction signal may instruct the signaling user interface to generate light signals, as previously described. The instruction signal may also include a type, duration, and/or frequency of the light signal. That is, the instruction signal may be timing signals that cause the light signals to turn on, transition from one color to another, flash, and/or otherwise during the warm swap procedure. For instance, the instruction signal may instruct electronics on the PCB 406 or be driver signals themselves to cause the LEDs 408 to generate a first light signal (e.g., flashing red light signal with a frequency of two flashes per second). This light signal may indicate that the warm swap procedure has been initiated, and, therefore, indicating that is unsafe for the user to remove or replace the battery until another light signal indicates to do so.

In an embodiment, latches 412 may also include resistive, contact, and/or other sensors (not shown) to determine whether the user has actuated either latch 412a or latch 412b. For instance, a user may exert force onto either latch 412a or latch 412b to actuate one or both latches. The latches 412 may be actuated by the user, and in response, the latch(es) 412 may cause an electrical signal to be communicated to a processor (not shown) of the mobile device to initiate the warm swap procedure. In an embodiment, electrical switch(es) may be disposed on or near the latch(es) 412 that, which actuated, cause the electrical switch(es) to trigger a signal. The switch(es) may be physical, electromagnetic, proximity, or otherwise. In response to sensing that the latches 412 have been actuated, a signal may be generated and communicated to a processor of a mobile device to which the battery pack 400 is engaged. The signal may indicate that the warm swap procedure is to be initiated. As described further herein, the processor may then initiate the warm swap procedure based on receiving an indication that the user has actuated one or both latches 412.

Figure 5:
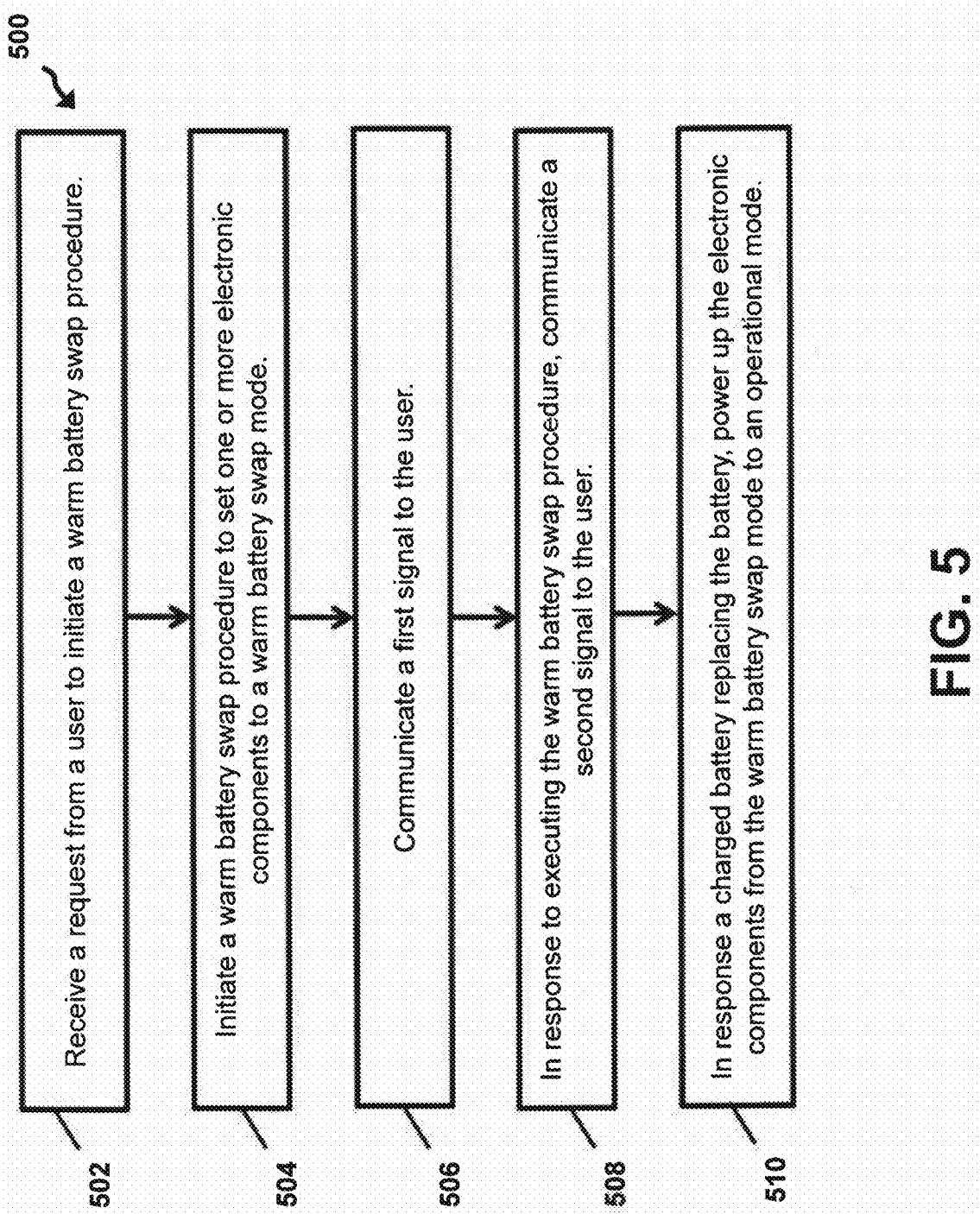
FIG. 5 is a flow diagram of an illustrative warm swapping procedure of a battery of a mobile device in accordance with the principles described herein.

With regard to FIG. 5, a flow diagram of an illustrative warm swapping procedure 500 of a battery of a mobile device in accordance with the principles described herein is shown. Other embodiments may comprise additional or alternative steps, or may omit some steps altogether.

At step 502, a processor of a mobile device may receive a request from a user to initiate a warm swap procedure. The processor may receive a signal that the user desires to replace the battery without powering off the mobile device. The signal may be generated as a result of a mechanical process, a software interaction by the user via an electronic display of the mobile device, or both. For instance, in an embodiment, the signal may be generated by a mobile application, optionally integrated into the operating system, executing on the mobile device. In those embodiments, the user may access the mobile application executing on the mobile device and transmit an instruction to the processor that the user desires a battery replacement using a warm swap procedure. In a non-limiting example, the user may indicate a desire to replace the battery pack via clicking, pushing, or otherwise interacting with the mobile application. In some configurations, the request may be received by a voice or gesture recognition module for the mobile device. For instance, the user may audibly indicate his desire to replace the battery pack using a warm swap procedure by saying, for example, "start warm swap of battery" into a microphone of the mobile device.

As previously described, the signal for initiating the warm swap procedure may be generated in response to a mechanical procedure performed by a user. For instance, the user may push or otherwise interact with a physical button associated with the mobile device. In some other embodiments, the user may interact (e.g., push) one or more battery latches to indicate a desire to replace the battery pack using a warm swap procedure. For instance, in a non-limiting example, a resistive sensor indicates that the user has exerted force upon one or more latches, which then causes the processor to receive a signal that the user has requests the warm swap procedure to be initiated. In some configurations, the signal may be generated as a result of the user interacting with only one latch. For instance, when the user pushes one latch, the processor receives a signal that the user has requested the warm swap procedure to be initiated. In some other embodiments, the user must push both latches simultaneously for the signal to initiate a warm swap to be transmitted to the processor.

At step 504, the processor may initiate a warm swap procedure to set one or more electronic components of the mobile device to a warm swap mode. The electronic components may be set to low power modes, disabled, or otherwise, to protect data and to protect the electronic components during the warm swap procedure while the first signal is indicating to the user that the warm swap procedure is being initiated.

As described hereinabove, the warm swap procedure ensures that the main power source (e.g., battery pack) may be removed from the mobile device and replaced with a new main power source without causing data to be lost or damaging electronic devices. Other limited functionality (e.g., reduced brightness, reduced communication speeds, reduced processing, reduced external device support, etc.) may be supported during a warm swap depending on the amount of power available and duration of time during the warm swap. In general, however, the warm swap procedure safely stores data and turns off most every other electronic device and function other than that which is used to save volatile data and protect electronic devices. Non-limiting examples of a warm swap procedure may include enabling a temporary secondary power source (e.g., a supercapacitor) to power the limited functionality of the mobile device for a temporary period of time to ensure that the mobile device has an uninterrupted and continuous flow of electric power.

At step 506, the processor may communicate a first signal to the user. In an embodiment, the communication of the first signal may be performed prior to step 504, thereby notifying the user that the warm swap procedure is occurring and to wait until completion. When the warm swap procedure starts, the processor may generate and transmit a signal/instruction to a signaling user interface to communicate the first signal to the user. The first signal may be a light signal, haptic signal, auditory signal, or any combination thereof. For instance the first signal may be a light with a static color (e.g., red), one or more flashing lights, auditory sound(s) emitted from speakers of the mobile device, vibration from a haptic device, etc. In some configurations, if the mobile device does not include non-standard lights (e.g., latches with lighting elements), the processor may activate an existing light source of the mobile device (e.g., camera light) positioned on the back of the device in order to communicate the signal(s) to the user when warm swapping the battery, where a first signal (e.g., one flash) may indicate that it is not safe to replace the battery pack.

The first signal may be communicated to the user until the warm swap procedure has completed execution (e.g., data is stored and electronic devices have been placed into safe modes). For example, the processor may continue communicating the first signal (e.g., lights illuminated red) to the user until the warm swap procedure has been executed. More specifically, the first signal may be communicated to the user until volatile data has been stored, electronic devices have been set to a low or no power mode, and a temporary power source, such as a supercapacitor, has been electrically engaged to source the electronic devices of the mobile device for the duration of the warm swap.

At step 508, a second signal may be communicated to the user in response to setting the electronic components of the mobile device in the low power mode. That is, when the Warm swap procedure has been executed and the mobile device is prepared for the battery to be swapped, the processor may communicate a second signal to the user, which is indicative that it is now safe to replace the battery pack. Similar to the first signal, the second signal may be a light signal, haptic signal, auditory signal, or any combination thereof. For instance the second signal may be a continuous light (e.g., green light), flashing light, and/or auditory sounds (e.g., tone or words) emitted from speakers of the mobile device. In some configurations, the processor may activate an existing light source of the mobile device (e.g., camera light) in order to communicate the second signal to the user. In some other configurations, the processor may display a value corresponding to a voltage of the battery. The second signal may indicate that it is safe to replace the battery pack.

In operation, the temporary power device (e.g., supercapacitor) may only preserve the warm swap mode for a limited time. To initiate the warm swap mode, the processor may route power from being sourced by the main power source (i.e., battery) of the mobile device to being sourced by a secondary, temporary power source (e.g., supercapacitor), which effectively initiates the warm swap procedure. The temporary power source may be configured to supply power for a limited amount of time to allow the user to replace the battery (e.g., less than 2 minutes). In some configurations, one or more electronic components of the mobile device may be placed into a low power mode so that an amount of power drawn from the temporary power source to allow the user to replace the battery. During that time, the second signal may continue to be output to the user. If the processor remains on, at least partially, during the warm swap, then the processor may communicate a signal to cause the second signal to be emitted for the user.

At step 510, in response to a charged battery replacing the battery during a warm swap procedure by the processor receiving a battery power signal, for example, the processor may power up the electronic components from the warm swap mode to be in an operational mode. In the power up, data that was temporarily stored in a protective memory may be restored in volatile memory such that the mobile device may be in the same state as prior to the warm swap. In response to the determination being made, the processor may stop the second signal from being communicated to the user. In an alternative embodiment, the second signal may be turned off independent from the processor issuing a command signal if other electronics are configured to control signaling for the warm swap procedure to the user.

In some configurations, the processor may start an internal timer corresponding to the time allotted to the user to replace the battery. When the timer expires, the processor may stop the second signal from being communicated to the user. Alternatively, the second signal may be stopped in response to the battery being replaced or the temporary power supply running out of power. In an embodiment, the processor may also cause a third signal to be generated to notify the user that the warm swap has successfully been completed. The third signal may cause a light signal that is different from the first and second signals to be generated in response to the battery successfully being replaced.

Figure 6:
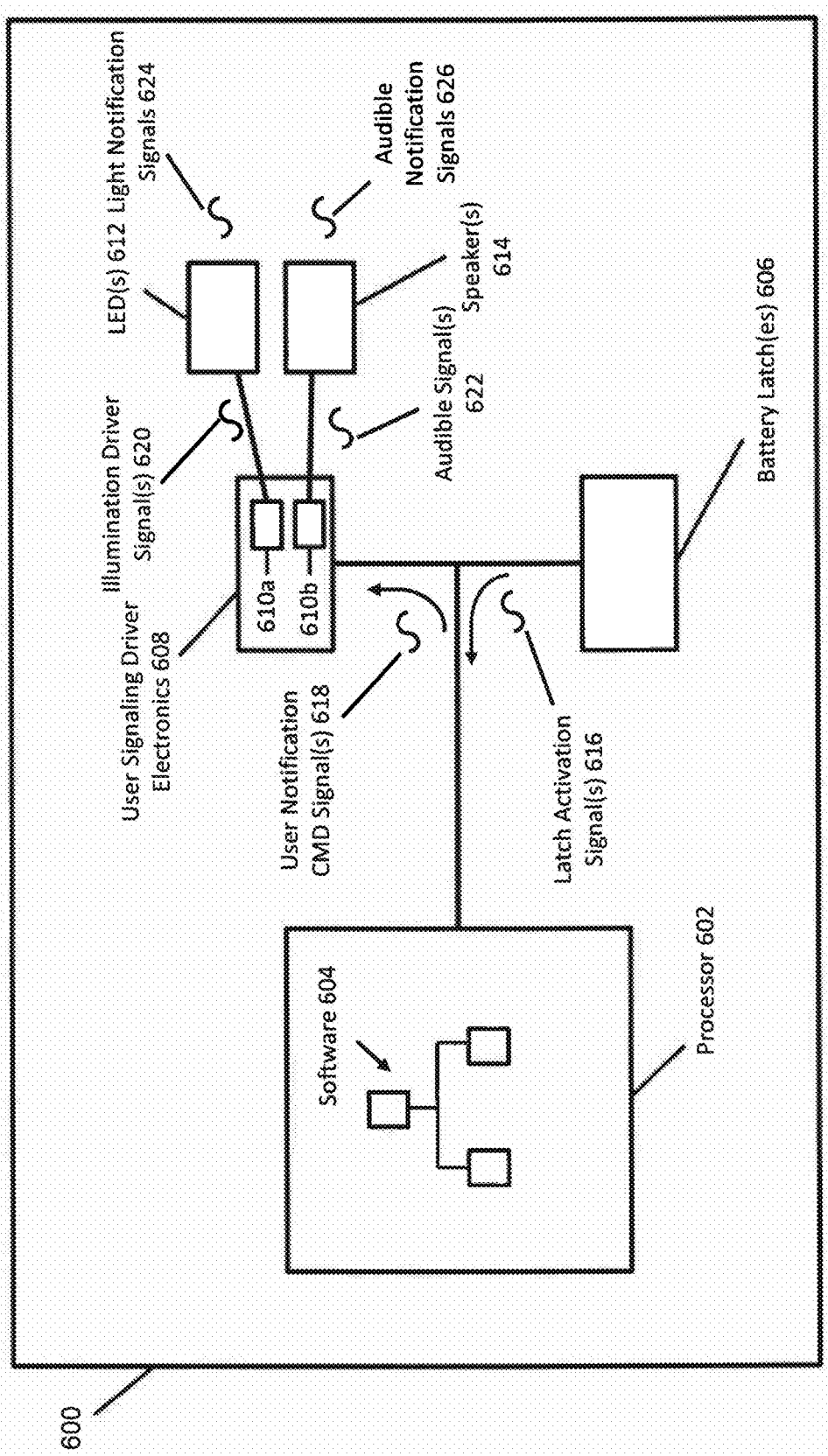
FIG. 6 is an illustration of illustrative electronics of a mobile device configured to perform warm swapping of a battery of a mobile device.

With regard to FIG. 6, an illustration of illustrative electronics 600 of a mobile device configured to perform warm swapping is shown. The electronics 600 may include a processor 602, software 604 executed by the processor 602, battery latch(es) 606, user signaling driver electronics 608, and user signaling drivers 610a and 610b (collectively 610) configured to drive LED(s) 612 and/or speaker(s) 614.

Figure 7:
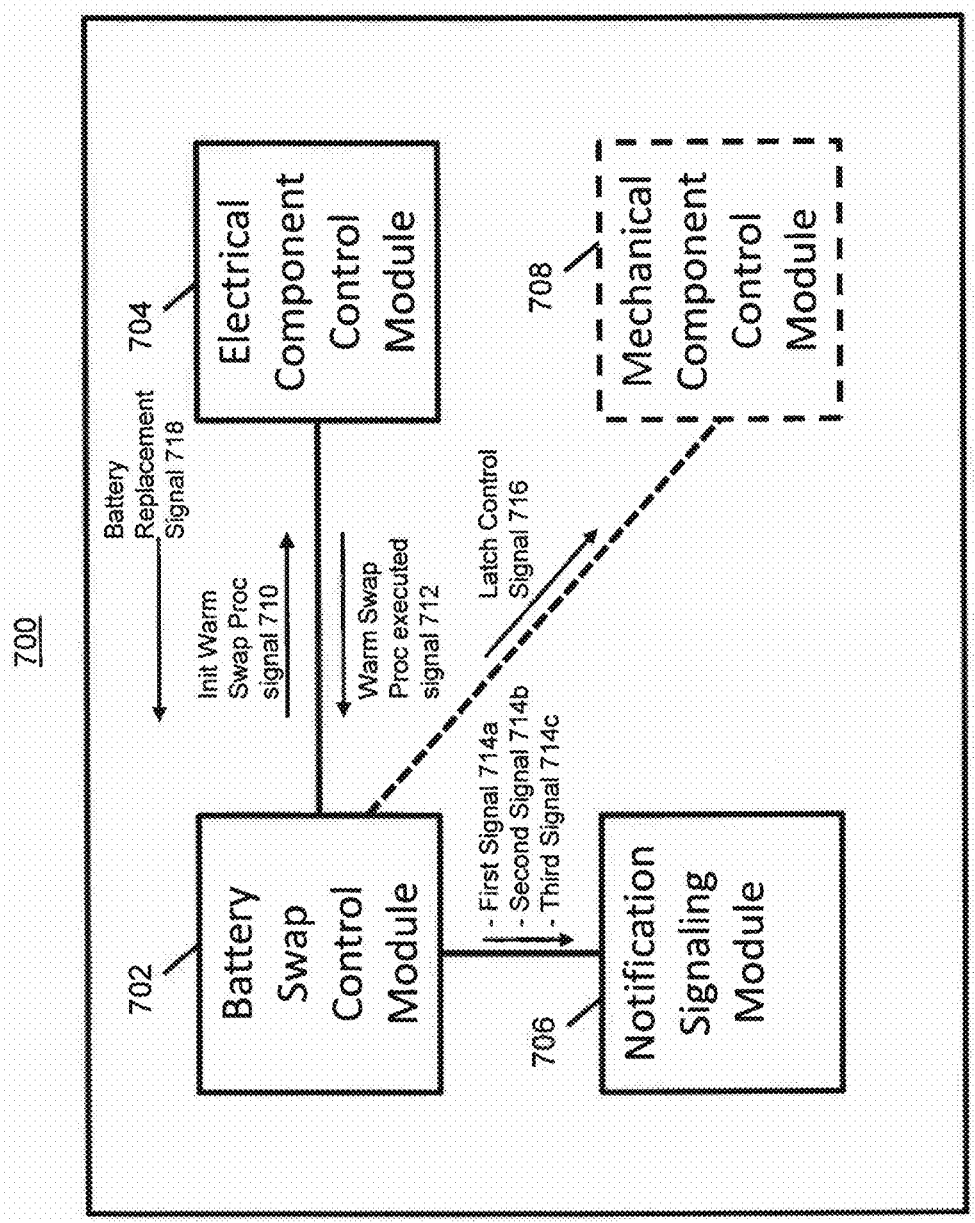
FIG. 7 is an illustration of an illustrative software system for warm swapping.

The processor 602 may execute software 604 inclusive of one or more software modules, such as provided in FIG. 7, and may be in direct or indirect electrical communication with the components illustrated within the electronics 600. The software 604 may be integrated into the operating system or may be an app integrated or independent of the operating system being executed by the processor 602. Still yet, the software 604 may be a combination of operating system and non-operating system software that communicate with one another in executing a warm swap procedure. For instance, the processor 602 may be in communication with the battery latch(es) 606, user signaling driver electronics 608, LED(s) 612, and speaker(s) 614.

In operation, the processor 602 may receive latch activation signal(s) 616 from the battery latch(es) 606, and in response, generate and transmit user notification command signal(s) 618. The latch activation signal(s) 616 may be analog signal(s). Alternatively, the signal(s) may be digital signal(s). Although the signal(s) 616 are generated in response to the user activating (e.g., pressing) the battery latch(es) 606, alternative configurations may provide signal(s) from other electronics, such as a power button or electronic display of the mobile device. The software 604 may, for example, include user interface software that allows for the user to selectably set the mobile device from a normal operating mode into a warm swap mode. In such a configuration and event, the software 604 may simply use data indicative of the user command to communicate the user notification command signal(s) 618 for notifying the user (i) that the mobile device is transitioning to the warm swap procedure, (ii) that the warm swap procedure is ready for the user to swap the battery, and optionally (iii) that the battery has been successfully swapped.

The user signaling driver electronics 608 may be configured to receive signals the signal(s) 618 from the processor 602, and generate, via the user signaling driver 610a, illumination driver signal(s) 620 to drive LED(s) 612. Similarly, the user signaling driver electronics 608 may be configured to receive the signal(s) 618 from the processor 602, and generate, via the signaling driver 610b, audible driver signal(s) 622 to cause the notification signals signal(s) to be played from the speaker(s) 614 to the user in performing the warm swap procedure. It should be understood that the configuration shown is illustrative, and that alternative configurations for driving the LED(s) 612 and speaker(s) 614 may be utilized, as understood in the art. Further, in some configurations, the processor 602 may generate the illumination driver signal(s) 620 and/or the audible signal(s) 622, and transmit the signals 620 and/or 622 to the LED(s) 612 and/or speaker(s) 614 directly. As shown, output from the LED(s) 612 are light notification signals 624, and output from the speaker(s) 614 are audible notification signals 626 in response to the driver signals 620 and 622, respectively.

With regard to FIG. 7, an illustration of an illustrative software system 700 executed by a processor of a mobile device, such as shown in FIG. 6, for performing warm swapping is shown. The software system 700 may include a battery swap control module 702 that may be configured to operate as a main controller of the warm swapping process. An electrical component control module 704 may be configured to control electrical components, including storing data that may be volatile in the event of a power disruption during the warm swap procedure, lowering power or turning off electrical components before the user is to swap the battery.

A notification signaling module 706 may be configured to drive notification signals for notifying the user (i) when the mobile device is preparing to enter the warm battery mode, (ii) when the mobile device is ready for the battery to be swapped, and (iii) optionally when the battery has been successfully replaced. An optional mechanical component control module 708 may be configured to drive an electromechanical device, such as a solenoid, that prevents at least one latch from being released until the mobile device is prepared for releasing the battery, thereby reducing the chance that the user will release the battery prior to being in the warm swap mode. It should be understood that the software system is show in a simplistic manner, and that more and/or alternative modules may be utilized in performing the warm swapping procedure. The software modules 702-708 are shown to be interactive with one another during the warm swap procedure, as described below.

In operation, in response to a request from the user to perform a warm swap procedure being received (e.g., via the user interacting with an application executing on the mobile device or the user actuating one or more battery latches), the battery swap control module 702 may generate and transmit an initiate warm swap procedure signal 710 to the electrical component control module 704 to initiate the warm swap procedure. The electrical component control module 704 may be configured to communicate with one or more electrical components of the mobile device, and cause the functionality of the one or more electrical components of the mobile device to be modified. For instance, the module 704 may modify display settings of an electronic display (e.g., lowering the brightness, disabling, etc.) of the mobile device, modify audio settings (e.g., lowering or terminating speaker functionality), and/or setting other electronic devices and/or functionality of the mobile device in a "low power" or "power conservation" mode. Additionally, any data that could be subject to loss may be stored during the procedure, as previously described.

In response to the initiation of the warm swap procedure, but before the execution or termination of the warm swap procedure, the battery swap control module 702 may generate and transmit a first signal 714a to the notification signaling module 706. The first signal 714a may instruct or otherwise cause the notification signaling module 706 to generate and transmit a first signal (e.g., illumination signal and/or auditory signal) to the user via light device(s) (e.g., LED(s), speaker(s), etc.). As previously described, one embodiment may cause LEDs disposed to illuminate via latches to turn red. The first signal 714a may indicate that the battery swapping procedure has started, and the user is to wait for a second signal before replacing the battery pack.

In response to completing preparation for the warm swap procedure (e.g., when data is stored and electrical components are placed in low and/or no power modes), the electrical component control module 704 may generate and transmit the warm swap procedure executed signal 712 to the battery swap control module 702. The signal 712 indicates that preparation for the warm swap procedure is completed, and the battery pack may safely be replaced by the user. In response to receiving the signal 712, the battery swap control module 702 may generate and transmit a second signal 714b to the notification signaling module 706. The second signal 714b may indicate that preparation for the warm swapping procedure has been executed, and the user may now replace the battery pack. The second signal 714b may cause the light device(s) to change color, such as from red to green, as previously described. The second signal 714b may also cause an audible signal to be generated, as further previously described.

In some configurations, the battery swap control module 702 may also determine that the battery pack has been replaced. For instance, the electrical component control module 704 may be configured to determine when a new battery has replaced the previous battery based on measured electrical power, and transmit a battery replacement signal 718 to the battery swap control module 702. In response, the battery swap control module 702 may generate and transmit a third signal 714c to the notification signaling module 706. The third signal 714c may terminate the second signal 714b from being communicated with the user (e.g., displayed or emitted), and cause another signal, such as a flashing green light, to the user. In some configurations, the battery swap control module 702 may also transmit a signal or an instruction to the electrical component control module 704 to cancel the warm swap procedure and reverse the functions performed when preparing to enter the warm swap procedure. For instance, electronics of the mobile device may be commanded to no longer be in the "low power" or "power conservation" mode, and data stored may be brought back into volatile memory.

In some configurations, and as previously described, in order to prevent premature battery replacement, the battery swap control module 702 may lock a latch that releases the battery. In such an embodiment, the battery latch(es) may be controlled by the battery swap control module 702, which may prevent the battery from being removed unless and until the latch is actuated by the battery swap control module 702. In a non-limiting example, a retaining structure of the battery pack may be controlled by an electromechanical member (e.g., solenoid-controlled hook, latch, or protrusion). The electromechanical member may prevent the battery from being released until transitioned to a release state. In some embodiments, in response to receiving the signal 712, the battery swap control module 702 may generate and transmit a latch control signal 716 to the mechanical component control module 708. The latch control signal 716 may cause the electromechanical member to release the battery. In this way, the user is prevented from prematurely replacing the battery (e.g., before the warm swap procedure has been executed in preparation for the user to swap the battery).

Figure 8:
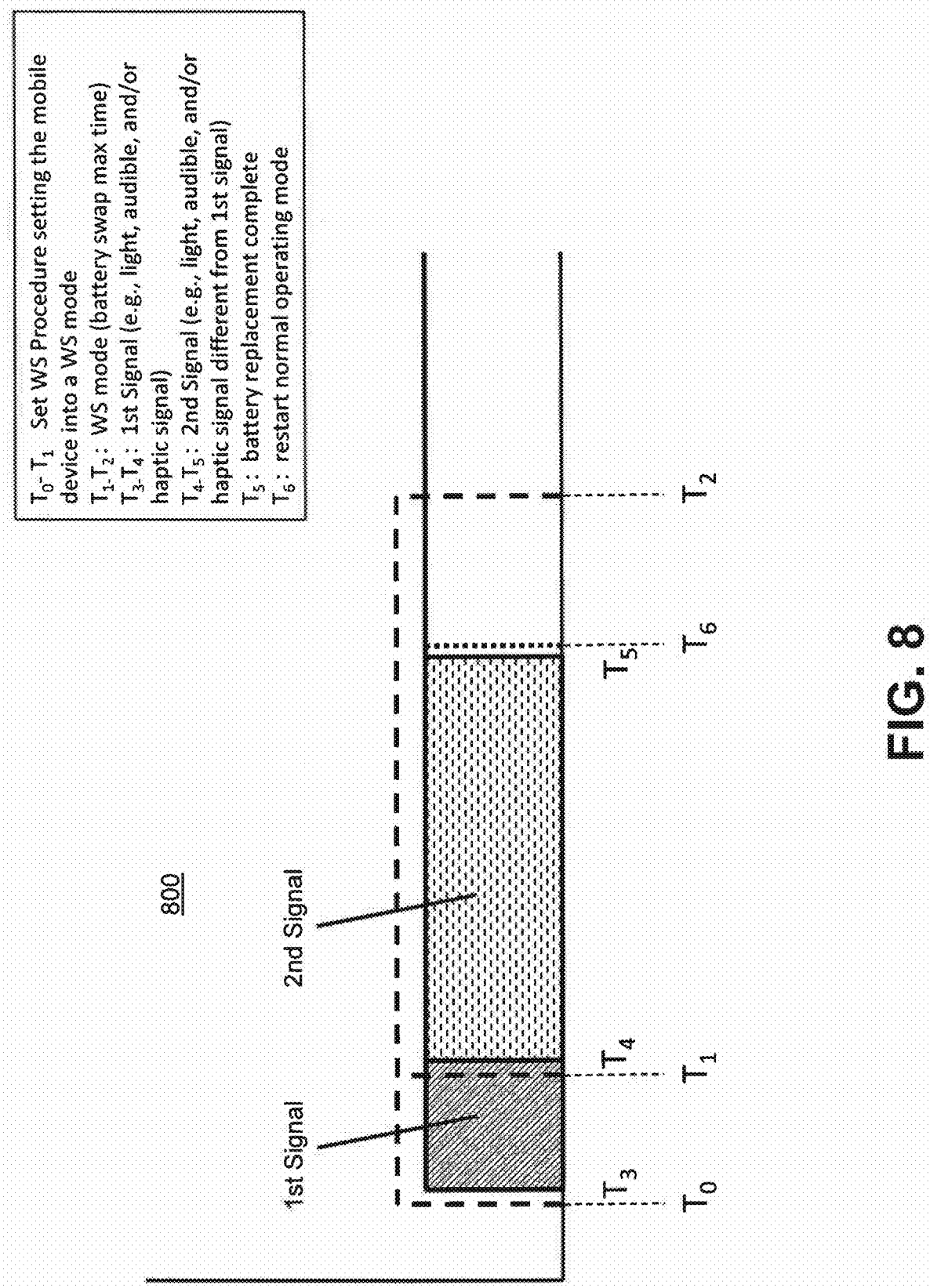
FIG. 8 is a graph of illustrative timing signals for communicating illumination signals while performing a warm swap of a battery of a mobile device.

With regard to FIG. 8, a graph of an illustrative set of timing signals 800 when performing a warm swap in replacing a battery of a mobile device is shown. The timing signals 800 illustrate that when the warm swap procedure is initiated between times $T_0$ and $T_1$, during which data may be stored and electronic devices may be set to a low power mode. Between times $T_1$ and $T_2$, the user is to replace a battery of the mobile device. After time $T_2$, a temporary charge device, such as a supercapacitor, runs out of charge, so the process, if not completed by that time, will naturally end. Between times $T_3$ and $T_4$, a processor of the mobile device may communicate a first signal to the user. As shown, time $T_3$ is after time $T_0$ as some initial processing may be performed before initiating the first signal to the user. In an alternative embodiment, the times $T_0$ and $T_3$ may be the same or substantially close to one another (e.g., within a few milliseconds). For instance, in response to the user actuating one or more battery latches or using a user interface via an electronic display of the mobile device, a processor may cause at least a portion of one or more battery latches to illuminate with a first light signal (e.g., flashing red light).

At $T_1$, the warm swap procedure has successfully executed the warm swap procedure (e.g., placed the mobile device in a low power mode and stored data) in preparation for a battery pack of the mobile device to be swapped. As a result, the battery pack may be replaced without data loss, for example, during time period $T_1$-$T_2$. After the warm swap mode has been entered at time $T_1$, a second signal may be communicated to the user at time $T_4$. In an embodiment, the processor illuminates at least a portion of the latch(es) with flashing green lights, where the second signal indicates to the user that it is now safe to replace the battery. During the time $T_1$-$T_2$, the processor keeps the mobile device in the warm swap mode unless otherwise interrupted by a signal that the battery has been replaced, as further described herein. The time period $T_1$-$T_2$ may be a pre-determined time period (e.g., less than 2 minutes) based on the size of the temporary charge device, amount of power drawn by electronic devices maintained in an ON or LOW power state, or otherwise.

Between times $T_4$ and $T_2$, the processor may cause the second signal (e.g., visual, audible, and/or haptic) to be communicated to the user indicating that it is safe for the user to replace the battery pack. If the user replaces the battery within the $T_1$-$T_2$ time period (e.g., the user replaces the battery at time $T_5$), the processor may receive a battery swap signal (not shown) and cause the second signal to stop by transitioning the mobile device out of the warm swap mode into an operational mode (fully or partially operational) at time $T_6$. Although not shown, a third signal may be communicated (e.g., visual, audible, haptic) to the user to indicate that the warm swap of the battery has been successfully completed.

Example No. 1

A user interacts with an application executing, optionally integrated into the operating system, on a mobile device and inputs a request to replace the mobile device's battery pack. The processor of the mobile device receives a signal from the application that indicates the user's request to replace the battery pack. The processor initiates a warm swap procedure. The warm swap procedure is a procedure that is configured to set one or more electronic components of the mobile device into a warm swap mode (e.g., low power mode and store data that would be lost if the battery were removed without storage). The processor also generates and communicates a first signal to the user (e.g., flashing red light emitted from a battery latches). The first signal indicates that the user is not to release the battery pack from its retaining structure. Once the electronic components are set into the warm swap mode, the processor generates and communicates a second signal to the user (e.g., flashing green light emitted from the battery latches). The second signal indicates that the user (i) may release the battery pack from its retaining structure and (ii) replace the battery pack. In response to the user replacing the battery pack with a charged battery pack, the processor powers up the electronic components of the mobile device from the warm swap mode to an operational mode. The processor also stops the second signal such that the second signal is no longer communicated.

Example No. 2

A battery pack is engaged with a mobile device via a retaining structure having two latches. A user actuates both latches to release and disengage the battery pack. The user actuates both latches of the retaining structure. In response, a resistive sensor, or another sensor configured to detect actuation of one or both latches, of the mobile device generates and transmits a signal to the processor of the mobile device. The signal indicates the user's request to replace the battery pack. In response to receiving the signal, the processor initiates a warm swap procedure, and follows the process(es) described hereinabove.

Example No. 3

A battery pack is engaged with a mobile device via a retaining structure having two latches. A user actuates each latch independently to release the battery pack. The user actuates a first latch of the retaining structure. In response, a resistive, contact, or other sensor of the mobile device generates and transmits a signal to the processor of the mobile device. The signal indicates the user's request to replace the battery pack. In response to receiving the signal, the processor initiates a warm swap procedure, and follows the process(es) described hereinabove.

Example No. 4

A battery pack is retained via a retaining structure having at least one latch. The latch is electromechanically controlled (e.g., solenoid) by a processor for the mobile device, such that the battery cannot be released without the processor actuating the latch. In response to receiving a signal indicating that the user has requested to replace the battery, the processor initiates a warm swap procedure. As described above, the processor may communicate a first and second signal while the warm swap is initiated and executed. Furthermore, in response to the electronic components being set into the warm swap mode, the processor causes the electromechanically controlled latch to release the battery or allow the battery to be released by the user.

Example No. 5

A mobile device's processor periodically monitors a battery pack engaged with the mobile device. Upon the battery voltage satisfying a pre-determined voltage threshold, the processor initiates the warm swap procedure. When the warm swap procedure has executed, the processor notifies the user via communicating the second signal to the user. In some configurations, the processor may also notify the user via an application executing on the mobile device. In response to the user replacing the battery pack with a charged battery pack, the processor powers up the electronic components of the mobile device from the warm swap mode to an operational mode. The processor also stops the second signal, such that the second signal is no longer communicated to the user.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed is:

1. A mobile device, comprising:
   a retaining structure configured to be actuated by a user and having two states, a first state configured to retain a removable battery pack housing a battery of the mobile device and a second state configured to release the removable battery pack of the mobile device, at least a portion of the retaining structure being configured to enable light to be emitted therefrom;
   an electronic signaling user interface including at least one light source, the at least a portion of the retaining structure emitting light signals produced by the at least one light source and through a translucent material disposed as part of the removable battery pack;
   a secondary temporary power source; and
   a processor in electrical communication with the electronic signaling user interface, and configured to:
     in response to receiving a request to perform a warm swap procedure:
       initiate the warm swap procedure to set electronic components to a warm swap mode and to temporarily transition electrical power sourcing from the battery to being from the secondary temporary power source;
       in response to initiating the warm swap procedure, cause the electronic signaling user interface to emit a first light signal by the at least one light source and through the translucent material of the removable battery pack;
       in response to setting the electronic components in the warm swap mode, when the secondary temporary power source has been established, cause the electronic signaling user interface to emit a second light signal by the at least one light source and through the translucent material of the removable battery pack, thereby indicating to the user that the battery of the mobile device can be warm swapped by actuating the retaining structure; and
       in response a charged battery replacing the battery, power up the electronic components from the warm swap mode to be in an operational mode.

2. The mobile device according to claim 1, wherein the retaining structure includes a first electromechanical actuator that is activated by the processor to release the retaining structure in response to execution of the warm swap procedure.

3. The mobile device according to claim 1, further comprising a sensor positioned at the retaining structure, and configured to sensing the user touching the retaining structure, and wherein the processor is configured to receiving a touch signal.

4. The mobile device of claim 1, wherein the translucent material extends on both a back portion and a side portion of the battery pack housing.

5. The mobile device of claim 1, wherein the at least one light source is positioned on a circuit board disposed within the battery pack housing which interfaces with the translucent material of the removable battery pack through which the light signals produced by the at least one light source pass to be viewable by the user.

6. The mobile device of claim 1, wherein the at least one light source is positioned on a motherboard for the mobile electronic device which interfaces with the translucent material of the removable battery pack through which the light signals produced by the at least one light source pass to be viewable by the user.

7. The mobile device of claim 1, wherein the retaining portion is configured as a latch.

8. The mobile device of claim 1, wherein the entirety of the latch is formed from the translucent material through which the light signals are illuminated.

9. A method of performing a warm swap of a battery of a mobile device, the method comprising:
initiating a warm swap procedure to set one or more electronic components of the mobile device to a warm swap mode and to temporarily transition electrical power sourcing from the battery to being from a secondary temporary power source integrated in the mobile device;
in response to initiating the warm swap procedure, when the secondary temporary power source has been established, generating a first notification signal, thereby indicating to a user to wait before removing the battery;
in response to execution of the warm swap procedure, generating a second notification signal, thereby indicating to the user that the battery of the mobile device is safe to be warm swapped; and
in response a charged battery replacing the battery of the mobile device, powering up the electronic components from the warm swap mode to be in an operational mode,
wherein generating the first and second notification signals includes emitting illumination signals from a retaining structure that retains a removable battery pack housing the battery to the mobile device, the illumination signals passing through a translucent material of the removable battery pack.

10. The method according to claim 9, wherein initiating the warm swap procedure is responsive to at least one of executing an software application or receiving a signal initiated by physical release of the battery.

11. The method according to claim 9, wherein generating the first notification signal includes emitting a first color via a light source disposed within the mobile device and which passes through the translucent material of the removable battery pack, and wherein generating the second notification signal includes emitting a second color via the light source disposed within the mobile device and which passes through the translucent material of the removable battery pack.

12. The method according to claim 9, wherein generating the first notification signal includes emitting a first light signal via a light source disposed within the removable battery pack and which passes through the translucent material of the removable battery pack, and wherein generating the second notification signal includes emitting a second light signal via the light source disposed within the removable the removable battery pack and which passes through the translucent material of the removable battery pack.

13. A mobile device comprising:
a retaining structure configured to be actuated by a user and having two states, a first state configured to retain a battery of the mobile device and a second state configured to release the battery of the mobile device, the retaining structure including:
a first retaining structure including a first location at which light signals are emitted; and
a second retaining structure including a second location at which light signals are emitted;
an electronic signaling user interface including at least one light source, the first and second retaining structures emitting light signals produced by the at least one light source;
a secondary temporary power source; and
a processor in electrical communication with the electronic signaling user interface, and configured to:
in response to receiving a request to perform a warm swap procedure:
initiate the warm swap procedure to set electronic components to a warm swap mode and to temporarily transition electrical power sourcing from the battery to being from the secondary temporary power source;
in response to initiating the warm swap procedure, cause the electronic signaling user interface to emit a first light signal by the at least one light source;
in response to setting the electronic components in the warm swap mode, when the secondary temporary power source has been established, cause the electronic signaling user interface to emit a second light signal by the at least one light source, thereby indicating to the user that the battery of the mobile device can be warm swapped by actuating the retaining structure; and
in response a charged battery replacing the battery, power up the electronic components from the warm swap mode to be in an operational mode.

14. The mobile device according to claim 13, wherein the first and second retaining structures are connected to a housing of the mobile device.

15. The mobile device according to claim 13, wherein the first and second retaining structures are connected to a housing of the battery.

16. A mobile device comprising:
a retaining structure configured to be actuated by a user and having two states, a first state configured to retain a battery of the mobile device and a second state configured to release the battery of the mobile device, at least a portion of the retaining structure being configured to enable light to be emitted therefrom;
an electronic signaling user interface including at least one light source, the at least a portion of the retaining structure emitting light signals produced by the at least one light source; and
a processor in electrical communication with the electronic signaling user interface, and configured to:
in response to receiving a request to perform a warm swap procedure:
initiate the warm swap procedure to set electronic components to a warm swap mode;
in response to initiating the warm swap procedure, cause the electronic signaling user interface to emit a first light signal by the at least one light source;
in response to setting the electronic components in the warm swap mode, cause the electronic signaling user interface to emit a second light signal by the at least one light source, thereby indicating to the user that the battery of the mobile device can be warm swapped by actuating the retaining structure; and
in response a charged battery replacing the battery, power up the electronic components from the warm swap mode to be in an operational mode,
wherein the retaining structure includes:

a first retaining structure including a first location at which light signals are emitted; and a second retaining structure including a second location at which light signals are emitted, and wherein the at least one light source includes:

a first light source disposed within the first retaining structure; and a second light source disposed within the second retaining structure.

17. A mobile device comprising:

a retaining structure configured to be actuated by a user and having two states, a first state configured to retain a battery of the mobile device and a second state configured to release the battery of the mobile device, at least a portion of the retaining structure being configured to enable light to be emitted therefrom, wherein the retaining structure includes:

a first retaining structure including a first location at which light signals are emitted; and a second retaining structure including a second location at which light signals are emitted;

an electronic signaling user interface including at least one light source, the at least a portion of the retaining structure emitting light signals produced by the at least one light source;

a processor in electrical communication with the electronic signaling user interface, and configured to:

in response to receiving a request to perform a warm swap procedure:

initiate the warm swap procedure to set electronic components to a warm swap mode;

in response to initiating the warm swap procedure, cause the electronic signaling user interface to emit a first light signal by the at least one light source;

in response to setting the electronic components in the warm swap mode, cause the electronic signaling user interface to emit a second light signal by the at least one light source, thereby indicating to the user that the battery of the mobile device can be warm swapped by actuating the retaining structure; and in response a charged battery replacing the battery, power up the electronic components from the warm swap mode to be in an operational mode, a first translucent window disposed on the first retaining structure;

a second translucent window disposed on the second retaining structure;

a first light pipe aligned to illuminate the first translucent window via the first retaining structure; and a second light pipe aligned to illuminate the second translucent window via the second retaining structure.

\* \* \* \* \*